Nov. 26, 1968    C. W. REED    3,413,450
COMPUTER-SCALER
Original Filed Sept. 12, 1961    2 Sheets-Sheet 1

INVENTOR.
CLIFTON W. REED
BY
Lilly & Nyhagen
ATTORNEYS

Nov. 26, 1968     C. W. REED     3,413,450
COMPUTER-SCALER
Original Filed Sept. 12, 1961     2 Sheets-Sheet 2
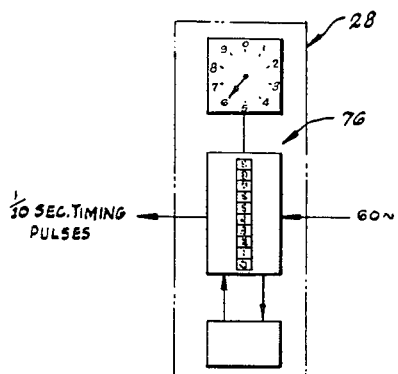
*Fig. 2*
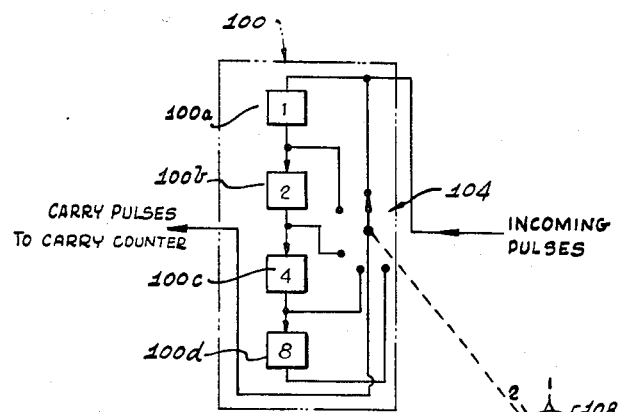
*Fig. 3*
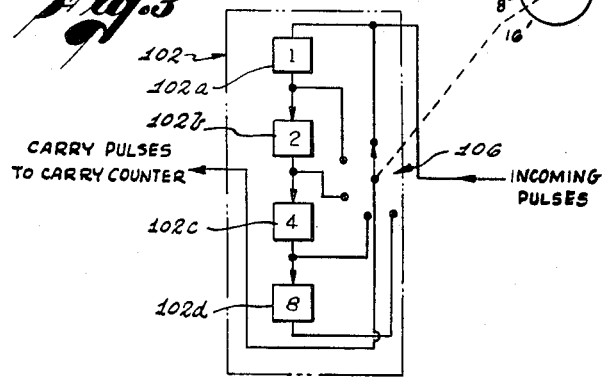
*Fig. 4*
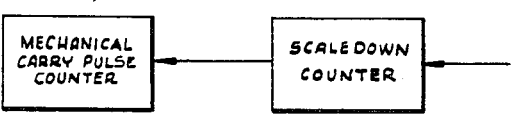
INVENTOR.
CLIFTON W. REED
BY *Lilly & Nyhagen*
ATTORNEYS

United States Patent Office 3,413,450
Patented Nov. 26, 1968

3,413,450
COMPUTER-SCALER
Clifton W. Reed, 5016 Calvin Ave.,
Tarzana, Calif. 91356
Continuation of application Ser. No. 137,572, Sept. 12, 1961. This application Mar. 25, 1965, Ser. No. 454,230
5 Claims. (Cl. 235—92)

ABSTRACT OF THE DISCLOSURE

A computer-scaler is provided for numerically displaying a quotient or ratio resulting from the division of a total number of pulses counted in a dividend count channel divided by a total number of pulses counted in a divisor count channel. The dividend and divisor count channels each include input terminals for receiving independent trains of pulses the ratio of which is to be determined. These trains of pulses may be of unknown frequencies which frequencies themselves may be either periodic or aperiodic. The divisor count channel includes means for generating an electrical control pulse in response to a predetermined accumulated pulse count constituting an integral multiple of $10^n$ where $n$ is any positive integer. The dividend count channel includes means for generating an electrical carry pulse in response to each Nth count or pulse received where N is a preselected integer equal to the said integral multiple. A digital carry pulse counter is included for counting the carry pulses and this carry pulse counter is terminated in response to generation of the control pulse from the divisor counter. The count displayed by the carry pulse counter upon termination is then equal to the quotient of the two trains of pulses times the factor $10^n$. A decimal position may be indicated in accord with the value of $n$ so that the carry pulse counter reads directly the ratio. In addition, a storage means may be provided in the divisor count channel for defining a time interval corresponding to the total time lapse necessary to accumulate the predetermined total pulse count in the divisor counter and this storage means may then operate at a subsequent time to start and terminate the counting by the dividend count channel such that again the displayed count by the carry pulse counter will indicate the desired ratio but wherein the two trains of pulses need not occur simultaneously.

---

Figure 1:
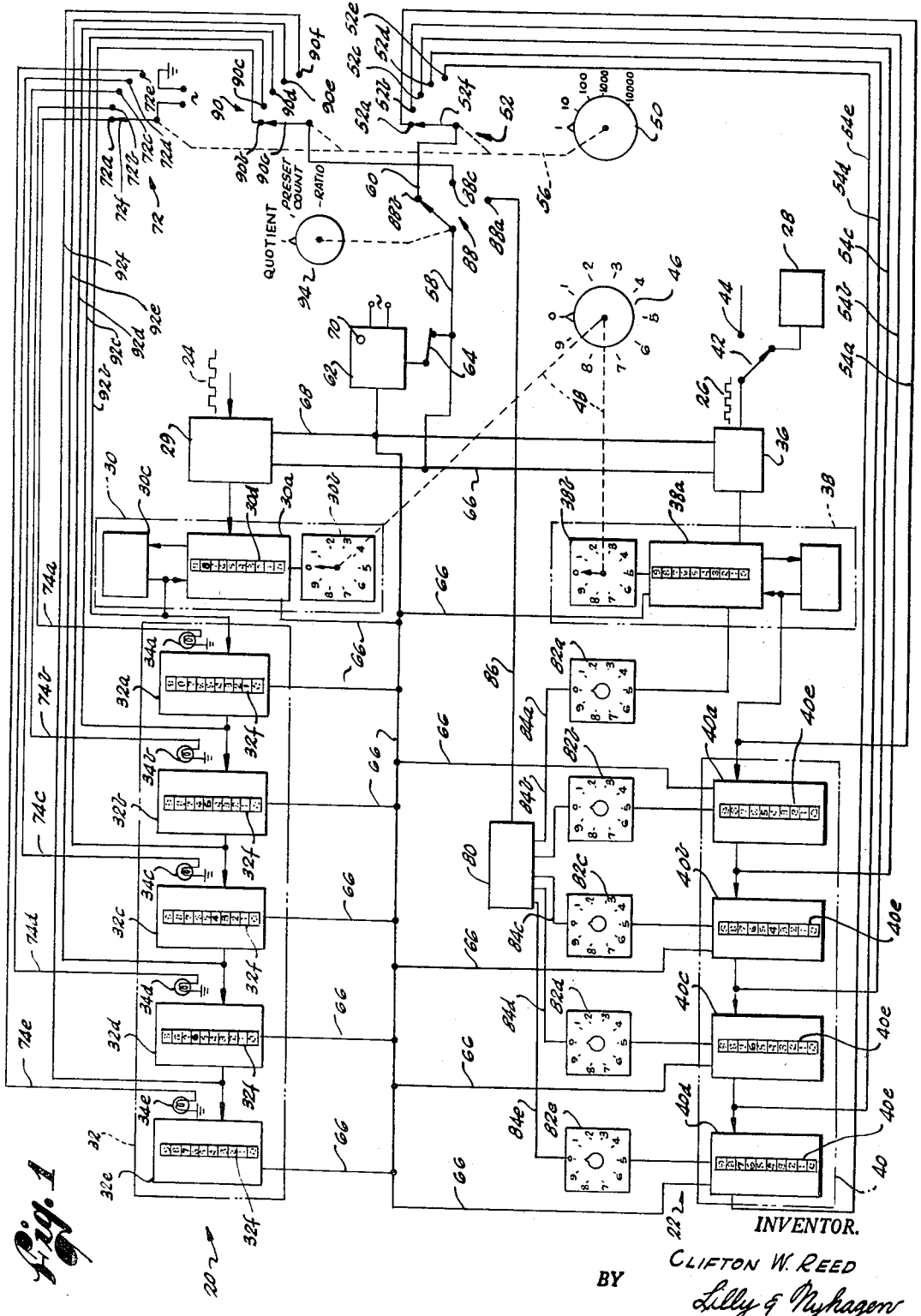

This application is a continuation of my copending application, Ser. No. 137,572, filed Sept. 12, 1961, for Computer-Scaler.

This invention deals generally with electronic counters and, more particularly, with a direct readout computer-scaler for computing and displaying quotients of pulse counts, pulse frequencies or counting rates, and percentage ratios of unknown frequencies to standard or reference frequencies.

Various types of computer-scalers are known to the art. One existing type of instrument, for example, is equipped with pulse counting means for developing the two counts whose quotient is desired and a separate computer which performs an electrical mathematical division operation to obtain the desired quotient. Instruments of this type are excessively complex and costly.

The complexity and cost of these instruments are avoided in another type of computer-scaler which is commonly employed in high frequency counting rate applications. This latter type of instrument is equipped with a decade counter and an accurate time interval generator which is capable of yielding accurate, even decade time base or counting time intervals, such as $10^{-3}$ second, $10^{-2}$ second, $10^{-1}$ second, 1 second, and 10 second intervals. These even decade time intervals make it possible to read out the counting rate directly from the counting channel decades so that computation by an external computer is unnecessary. That is to say, since the elapsed time of the pulse count or counting interval with an instrument of this type is always an even decade interval, the total count displayed by the instrument is obviously the numerical value of the counting rate. The only additional step necessary to obtain the counting rate itself is to properly indicate the decimal point, which can be easily done because of the even decade counting interval employed.

Computer-scalers of this latter type, however, are not satisfactory for many counting applications. In the nuclear field, for example, the desire to work with activities as low as practical and the random nature of emissions of radioactive sources require relatively long counting intervals in order to obtain reasonable counting accuracy. Rarely are measurements made in less than 1 second in the nuclear field and, in most cases, the counting interval is more than 10 seconds.

In the nuclear field, therefore, as well as in other fields in which relatively long counting periods are required for reasonable counting accuracy, it is desirable to have available a computer-scaler which is capable of displaying directly the counting rate for a counting interval which is longer than 1 second and, in the great majority of cases, longer than 10 seconds. It is obvious, of course, that if an even decade counting interval is selected, such as 1 second, 10 seconds, 100 seconds, or 1,000 seconds, the direct reading even decade computer-scaler mentioned above could be used. From a practical point of view, however, the time interval steps between these even decade intervals are too long in terms of practical measuring time. That is to say, in many counting applications, a counting interval of 10 seconds or 100 seconds may be too short to obtain a reasonable counting accuracy, while the next counting intervals which can be employed in the existing equipment, namely, 100 seconds or 1,000 seconds, may be too long because of the limitation they place on the number of samples or measurements that can be handled during a normal work period. The optimum counting interval might be 30 seconds or 300 seconds, for instance. Such counting intervals cannot be employed in the existing direct reading computer-scalers. For this reason, up to the present time, it has been impractical to employ a decimal time basis as a means of obtaining counting rate readouts of low frequency inputs.

This invention provides a new and unique computer-scaler which furnishes a direct readout countering rate or frequency display for preset counting time intervals other than fixed even decade intervals. These preset counting intervals may correspond, for instance, to unit steps in a decimal counting system, binary steps in a binary counting system, or corresponding steps in any other counting system. In one illustrative form of the invention, for example, decimal time interval steps of 1 through 9 with any one of the decimal multipliers $10^0$, $10^1$, $10^2$, $10^3$ and $10^4$ can be selected to give preset counting time base intervals of 1 second, 2 seconds, 3 seconds, . . . 9 seconds times any one of the decimal multipliers. In another illustrative form of the invention, binary time interval steps of 1 second, 2 seconds, 4 seconds, 8 seconds, 16 seconds times any one of the decimal multipliers can be selected.

While the discussion thus far has related only to the computation and display of counting rates or frequencies, i.e., quotient computations in which the divisor count equals units of time which are derived from a time interval generator or other timing mechanism, the present instrument is cable of computing and displaying quotients of two pulse counts where the pulses are derived from any sources. When the computation is other than a frequency or count rate computation, the instrument is operated on a preset divisor count basis rather than a preset time basis.

In this case, the instrument furnishes a direct readout quotient display for preset divisor count steps other than fixed even decade steps which may correspond to unit steps in a decimal system, binary steps in a binary system, or to corresponding steps in any other counting system as discussed above in connection with counting rate or frequency computations. The instrument can also be used for ratio counting in which an unknown count rate may be read out directly as a percent of a reference or standard frequency.

It should be pointed out here that the expression "pulse" as used herein is intended to encompass not only distinct electrical pulses according to the more commonly accepted definition of the expression but also the peaks of a continuous wave form signal, such as a sine wave signal, as well. Accordingly, the expression "pulse counter" as used herein is meant to cover an instrument for counting both the distinct pulses in a pulse train and the peaks of a continuous wave form signal.

With this preliminary discussion in mind, a general object of the present invention may be stated as being to provide a new and unique direct readout computer-scaler for computing and displaying the quotient of pulse counts, counting rates or frequencies, and frequency ratios.

A more specific object of the invention is to provide a direct readout computer-scaler of the character described which employs a preset divisor count or time base that may be other than an even decade count or interval.

Another object of the invention is to provide a direct readout computer-scaler of the character described which can be designed to utilize a decimal counting system, a binary counting system, or any of the other known counting systems.

A further object of the invention is to provide a computer-scaler of the character described which is especially suitable for electronic and nucleonic count rate or frequency measurements which require medium to long time base intervals.

Yet a further object of the invention is to provide a direct readout computer-scaler of the character described in which the decimal point is automatically indicated in the quotient, frequency, or ratio display of the instrument.

A still further object of the invention is to provide a direct readout computer-scaler of the character described which is relatively simple in construction, inexpensive to manufacture, compact, and otherwise ideally suited to its intended purposes.

Other objects, advantages, and features of the invention will become readily apparent as the description proceeds.

Briefly, the objects of the invention are attained by providing a computer-scaler equipped with two separate count channels. One of these channels, hereinafter referred to as the divisor count channel, develops the count which is the divisor of the quotient, frequency, or ratio displayed by the instrument. The other channel, hereinafter referred to as the dividend count channel, develops the count which is the dividend of the display.

The divisor count channel includes a counter, which may be a digital pulse counter where the measurement to be made is the quotient of two pulse counts or the ratio of two frequencies, or a timer where the measurement to be made is a frequency or counting rate determination, with means for displaying the accumulated pulse count or expired time. The dividend count channel includes a digital scaledown pulse counter with means for developing a carry pulse in response to each Nth count of the latter counter, where N is a scaledown factor equaling a preselected integer, and a digital carry pulse counter for counting and displaying the total number of carry pulses developed by the scaledown counter.

During operation of the instrument to make a quotient determination, the incoming pulses from which the dividend count is derived are fed to the dividend count channel and the incoming pulses from which the divisor count is derived are fed to the divisor count channel. The scaledown counter develops a carry pulse in response to each Nth count and the carry pulses are counted in the carry counter which continuously displays the accumulated carry pulse count. The count is terminated when the scaledown factor N is in the ratio of $10^n$ to the accumulated pulse count in the divisor channel counter, where $n$ is an integer, which, in the broad concept of the invention, may be any plus or minus integer. At the end of the counting interval, the total accumulated pulse count $C_1$ in the dividend count channel is $$C_1 = R \times N + r$$

where R is the reading of the carry counter and $r$ is the count remaining in the scaledown counter at the end of the counting interval. The quotient Q of the total accumulated pulse count in the dividend channel over the accumulated pulse count $C_2$ in the divisor count channel is then $$Q = \frac{C_1}{C_2} = \frac{R \times N + r}{C_2}$$

Since, as already noted, the scaledown factor N is in the ratio of $10^n$ to the accumulated pulse count in the divisor channel counter, i.e., $N/C_2 = 10^n$, the above equation becomes $$Q = R \times 10^n + \frac{r}{C_2}$$

In other words, if the count is terminated when the dividend scaledown factor is in the ratio of an integer power of 10 to the total accumulated divisor count, the accumulated carry pulse count R displayed by the carry counter at the end of the counting interval will be numerically equal to the quotient of the total accumulated pulse count in the dividend count channel over the accumulated pulse count in the divisor channel counter with an error equal to $r/C_2$. This error is maximum, for any given accumulated divisor count $C_2$, when the remainder count $r$ is 1 less than N, the number of counts necessary in the scaledown counter to develop a carry pulse. As the accumulated divisor count $C_2$ increases, of course, the error $r/C_2$ approaches zero and, if the divisor count $C_2$ is sufficiently large, the error can be neglected. In this case, $$Q = R \times 10^n$$

so that the carry count displayed by the carry counter can be taken to indicate the numerical value of the quotient Q. All that is then necessary to obtain the decimal value of the quotient is to properly set off the decimal point, the position of which is fixed by the power $n$ which is known. In the illustrative embodiment of the invention, the position of the decimal point is indicated automatically in the quotient display of the carry counter by means of a light in the display.

When making a frequency or counting rate measurement with the instrument, the divisor count $C_2$ equals units of time, such as seconds, obtained from a timer in the divisor count channel. In a simple form of the present instrument, this timer may comprise a time clock to be read by the operator of the instrument. In the more sophisticated, illustrative embodiments of the instrument, the timer consists of a time interval generator for generating timing pulses at predetermined time intervals, such as .1 second intervals, and a digital counter for counting and displaying the total number of timing pulses generated by the time interval generator. The illustrative embodiments of the present instrument are also equipped with means for presetting different preselected divisor counts or time base intervals into the divisor count channel and terminating the count automatically in response in the accumulation of the preset count or time interval in the divisor channel and with means for presetting an appropriate scaledown factor in the scaledown counter of the dividend count channel such that the carry counter will display the correct quotient of the dividend and divisor channel counts or the correct counting rate or frequency when counting is terminated.

A unique feature of the illustrative embodiments of the invention resides in the fact that the divisor count, like the dividend count, is scaled down by a preset scaledown factor equal to the scaledown factor in the dividend count channel. This is accomplished by means of a scaledown counter into which the scaledown factor is preset simultaneously with presetting of the scaledown factor into the scaledown counter of the dividend count channel. The carry pulses developed by the divisor channel scaledown counter are counted and their accumulated number is displayed by a carry pulse counter in the divisor channel. As will be seen, this greatly simplifies the equipment.

When the instrument is used for ratio counting, i.e., determining the ratio of an unknown frequency to a standard reference frequency, the unkown frequency $f_1$ is fed to the dividend count channel and the standard or reference frequency $f_2$ is fed to the divisor count channel. The count is stopped at a present accumulated count in the divisor count channel. The unknown frequency $f_1$ is equal to the total accumulated dividend channel count $C_1$ divided by the elapsed time T of the measurement and the standard frequency $f_2$ is equal to the total accumulated divisor channel count $C_2$ divided by the elapsed time T of the measurement. Since the elapsed time of measurement is the same for both channels, the frequency ratio $f_1/f_2$ is $$\frac{f_1}{f_2} = \frac{C_1/T}{C_2/T} = \frac{C_1}{C_2}$$

Now, the total accumulated dividend channel count equals the reading R of the dividend channel carry counter times the present scaledown factor N in the dividend channel scaledown. If the count is terminated when the scaledown factor N is in the ratio of $10^n$ to the total accumulated divisor channel count $C_2$ and any remaining count in the dividend channel scaledown counter is neglected, as before the above equation becomes $$\frac{f_1}{f_2} = \frac{C_1}{C_2} = \frac{R \times N}{C_2} = R \times 10^n$$

In other words, the reading of the scaledown counter will be the numerical value of the frequency ratio. The percentage value of the ratio is obtained by simply setting off the decimal point, the position of which is fixed by the known power $n$ and is indicated automatically in the instrument.

The above method of ratio counting requires that both frequencies be available at the same time. In some situations, however, only one frequency may be available at a time. In this case, the known frequency is counted first in the dividend channel and the elapsed time to reach a preset count is noted. The unknown frequency is then counted in the dividend channel for the same length of time and with a scaledown factor preset in the dividend channel scaledown counter which is in the ratio of $10^n$ to the preset known frequency count. Here, again, then, the reading of the dividend channel carry counter at the end of the unknown frequency count is numerically equal to the ratio of the two frequencies. The decimal point is indicated automatically as before.

In the foregoing discussion, the remainder count in the dividend channel scaledown counter has been neglected. However, the remainder count can be taken into account to obtain as accurate a measurement as desired by use of a table relating the remainder count to the particular scaledown factor used to obtain additional decimal places. Electrical interpretation is also possible by means of a simple matrix for relating the scaledown factor to the remainder count.

The illustrative embodiments of the invention will now be described in detail by reference to the attached drawings, wherein:

FIG. 1 diagrammatically illustrates one form of the present instrument which uses decade counters in the dividend and divisor count channels and operates on a decimal counting system;

FIG. 2 diagrammatically illustrates one type of time interval generator which can be used in the instrument;

FIG. 3 diagrammatically illustrates simplified binary scaledown counters which can be used in the instrument in place of the decade scaledown counters in FIG. 1; and FIG. 4 diagrammatically illustrates the use of a mechanical carry counter with an electronic scaledown counter to obtain an electromechanic, direct readout computer-scaler.

Reference is made first to the decimal system instrument illustrated in FIGS. 1 and 2 of these drawings, wherein numeral 20 denotes the dividend count channel and numeral 22 the divisor count channel of the instrument. During operation of the instrument, the electrical pulses 24 from which is to be derived the dividend count for the quotient or ratio determination made by the instrument are delivered to the dividend count channel 20. The electrical pulses 26 from which is to be derived the divisor count for the determination are delivered to the divisor count channel 22. As noted earlier, these electrical pulses may consist of discrete pulses, such as square wave pulses, for example, according to the more commonly accepted definition of the term "pulse," or they may comprise the peaks of a continuous wave form signal, such as a sine wave signal. Also, these pulses may be derived from any desired external sources. When making a counting rate or frequency determination, however, pulses 26 which are delivered to the divisor channel 22 are derived from a time interval generator 28 in the divisor channel 22 and comprise timing pulses which occur at predetermined time intervals, such as .1 second intervals.

Dividend count channel 20 includes an input gate or switch 29 through which the pulses 24 enter the dividend channel. During operation of the instrument, this gate is opened, to terminate counting in the dividend channel, in response to a predetermined accumulated pulse count in the divisor count channel 22.

Input gate 29 feeds a digital pulse counter 30, which is hereinafter referred to as a scaledown counter for reasons which will become apparent as the description proceeds. This scaledown counter may comprise any one of several different types of conventional digital counters with means for developing a control pulse capable of actuating a following counter in response to each Nth count of the scaledown counter, where N is a presettable scaledown factor which can be selected from a series of preselected integers. The preset decade counter described in the manual entitled Instruction Manual Moder 101A Preset Decade Counting Unit distributed by Computer-Measurements Company, of Sylmar, Calif., is such a counter. For convenience, scaledown counter 30 has been illustrated as being of the type disclosed in this manual.

As described more fully in the manual, counter 30 comprises a decade counting unit 30a with a presettable selector switch 30b having ten positions associated with the integers 0 through 9, respectively, and a reset pulse generator 30c. In operation, decade counting unit 30a senses the number of electrical pulses fed to its input and displays the count of pulses received on an illuminated scale 30d. This display scale consists of the integers 0 through 9 which are consecutively illuminated in response to consecutive counts of the counting unit 30a. Counting unit 30a also compares the input pulse count with the integer associated with the preset position of the selector switch 30b and, when the pulse count and preset integer coincide, the counting unit delivers a coincidence pulse to the reset pulse generator 30c, as indicated. This generator is triggered by and develops a reset pulse in response to each coincidence pulse. Each reset pulse, in turn, is delivered back to the decade counting unit 30a and resets the latter back to zero, after which counting starts anew in the counting unit. Thus, for example, if the selector switch 30b is preset to the position associated with the integer 6, decade counting unit 30a counts up to 6 and then rests to zero, after which the counting unit again counts to 6 and again resets, and so forth. If the selector switch is preset to the position associated with integer 3, the counting unit 30a counts to 3 and resets. In this invention, the integers 0 through 9 which are associated with the positions of selector switch 30b are the scaledown factors N and switch 30b is a scaledown factor selector switch.

According to this invention, the reset pulses developed by the reset pulse generator 30c are also delivered to the input of a second digital counter 32 in the dividend count channel 20. Digital counter 32 may comprise any conventional digital counter capable of counting and displaying the reset pulses developed by the reset pulse generator 30c. For illustrative purposes, digital counter 32 has been illustrated as comprising a decade counter including a units decade 32a, a 10's decade 32b, a 100's decade 32c, a 1,000's decade 32d, and a 10,000's decade 32e. Each decade has a display scale 32f like that described in connection with the counting unit 30a. For reasons which will become evident as the description proceeds, the reset pulses which are delivered by the scaledown counter 30 to the decade counter 32 are hereinafter referred to as carry pulses and the counter 32 is referred to as a carry pulse counter. Carry pulse counter 32, then, counts and displays the total number of carry pulses developed by the scaledown counter 30.

Between the decades of the carry counter 32 are small lamps 34a, 34b, 34c, 34d and 34e. As will shortly be described, these lamps are selectively illuminated during operation of the instrument to indicate the position of the decimal point in the carry pulse count displayed by the counter 32.

Divisor count channel 22 is generally similar to the dividend count channel 20 in that the divisor count channel includes an input switch or gate 36 through which the pulses 26 enter the latter channel, a digital scaledown pulse counter 38 identical to the scaledown counter 30 for counting the incoming pulses 26 and developing a carry pulse in response to each Nth count of the scaledown counter, where N is the integer or scaledown factor associated with the preset position of the scaledown factor selector switch 38b of the counter 38, and a digital carry pulse counter 40, including counting decades 40a, 40b, 40c and 40d for counting and displaying the total number of carry pulses developed by the scaledown counter 38. Each decade 40a, 40b, 40c and 40d includes a display scale 40e for displaying the current count in the decade. Time interval generator 28 in the divisor count channel 22 is located ahead of the divisor channel gate 36. A switch 42 is provided for selectively connecting the input of the gate 36 to the time interval generator 28 or to a second input terminal 44 through which pulses from an external source may be delivered to the divisor count channel 22.

Indicated at 46 is a selector knob for simultaneously presetting the scaledown factor selector switches 30b and 38b of the scaledown counters 30 and 38. Selector knob 46 has ten positions identified by the integers 0 through 9, respectively, and is operatively connected with the selector switches 30b and 38b through linkage 48. This linkage is arranged in such a way that turning of the selector knob 46 to any selected one of its ten positions simultaneously turns the scaledown factor selector switches 30b and 38b to the positions associated with the scaledown factor which is numerically the same as the integer identifying the selected position of knob 46. Thus, if the selector knob 46 is turned to the position identified by integer 7, selector switches 30b and 38b are simultaneously turned to the positions associated with scaledown factor 7.

During operation of the divisor channel carry pulse counter 40, each decade 40a, 40b, 40c and 40d of the counter counts up to 9 and then resets to zero. As each decade resets, it develops a carry pulse which is delivered to and advances by one the following decade, in the well-known way. The carry pulses developed by the divisor scaledown counter 38 and by the decades 40a, 40b, 40c and 40d are utilized to open the input gates 29 and 36 and thereby terminate counting in the dividend and divisor count channels. This is accomplished as follows: Indicated at 50 is a selector knob having positions identified by the decimal multipliers 1, 10, 100, 1,000 and 10,000, respectively, as shown. Operated by this selector knob is a selector switch 52 having contacts 52a, 52b, 52c, 52d and 52e which are electrically connected through leads 54a, 54b, 54c, 54d and 54e, respectively, to the outputs of the scaledown counter 38 and the decades 40a, 40b, 40c and 40d, respectively. Selector switch 52 further includes a rotatable contact 52f, fixed to the shaft 56 of the selector knob 50, which engages contact 52a when the selector knob 50 occupies the position identified by the decimal multiplier 1, contact 52b when the selector knob 50 occupies the position identified by the decimal multiplier 10, contact 52c when the selector knob occupies the position identified by the decimal multiplier 100, contact 52d when the selector knob occupies the position identified by the decimal multiplier 1,000, and contact 52e when the selector knob occupies the position identified by the decimal multiplier 10,000. Switch contact 52f is electrically connected with the input gates 29 and 36 through leads 58 and 60. When the selector knob 50 is turned to any one of its positions, then, the selector switch contact 52f is rotated into engagement with the corresponding switch contact 52a, 52b, 52c, 52d or 52e, as the case may be, and a pulse is delivered to the gates 29 and 36, through the selector switch 52, when the scaledown counter or the corresponding decade 40a, 40b, 40c, 40d of the divisor channel carry counter resets and develops a carry pulse. The pulse thus delivered to the input gates 29 and 36 is hereinafter referred to as a control pulse and operates to open the gates and thereby terminate counting in both count channels. For example, if the selector knob 50 is turned to the position identified by decimal multiplier 100, a control pulse is delivered to the input gates 29 and 36 when the 100's decade 40b of the counter 40 resets to zero and delivers a carry pulse to the following 1,000's decade 40c. This occurs, of course, on the tenth count of the 100's decade 40b or at a total accumulated count of 1,000 in the divisor channel.

Indicated at 62 is a reset pulse generator, which may be like the reset pulse generator 30c, having its input connected to lead 58 through a switch 64. When switch 64 is closed, the control pulse delivered to the input gates 29 and 36 through the selector switch 52 is also delivered to the reset pulse generator 62. This generator generates a reset pulse in response to the control pulse, which reset pulse is applied to the counters 30 and 32 of the dividend channel and the counters 38 and 40 of the divisor channel, through leads 66, for resetting the counters to zero. Input gates 29 and 36 are of a type which remain open once they are actuated by the control pulse delivered through the selector switch 52. The reset pulses generated by the reset pulse generator 62 are also delivered to the input gates 29 and 36, through leads 68, and serve to re-open these gates. Gates 29 and 36 might comprise, for example, normally closed relays with holding circuits which lock the relays in their open, energized state in response to initial energization of the relays by the control pulse delivered through the switch 52 and normally closed relays in the holding circuits which are energized by the reset pulse from generator 62 to break the holding circuits. Included in the reset pulse generator 62 is a manual reset switch 70. Reset pulse generator 62 generates a reset pulse in response to manual operation of switch 70, even though switch 64 is open, which reset pulse resets the several counters of the instrument and opens the input gates 29 and 36.

Selector knob 50 operates a second selector switch 72 having contacts 72a, 72b, 72c, 72d and 72e connected to the decimal point indicating lamps 34a, 34b, 34c, 34d and 34e, respectively, through leads 74a, 74b, 74c, 74d and 74e, respectively. Included in the switch 72 is a switch contact 72f fixed to the shaft 56 of the selector knob 50 which engages the contacts 72a through 72e as the selector knob 50 is turned to its various positions to complete energizing circuits through the lamps 34a through 34e. Thus, for example, when the selector knob 50 is turned to the position identified by the decimal multiplier 1,000, selector switch contact 72f is rotated into engagement with switch contact 72d to energize lamp 34d.

In describing the operation of the instrument, we will first assume that the quotient of two pulse counts, derived from incoming pulses 24 and 26 from two external sources (not shown), is to be determined. In this case, the divisor count channel switch 42 is shifted to its position of engagement with input terminal 44 of the divisor count channel so that the incoming pulses to the divisor count channel from the external source are delivered to the latter channel through the input terminal 44. Scaledown counter 30 in the dividend count channel 20 counts the incoming pulses 24 and develops a carry pulse in response to each Nth count of the counter 30, where N is the scaledown factor corresponding to the preset position of the scaledown factor selector switch 30b in the counter. The carry pulse counter 32 in the dividend count channel, in turn, counts and displays the number of carry pulses developed by the scaledown counter 30. The accumulated carry pulse count can be read from the display scales 32f in the decades 32a through 32e of the carry counter at any time. Assuming that the dark integers in the display scales 32f are the illuminated integers indicating the current count in each decade, for example, the carry count reading of the carry counter is 76451. The total accumulated pulse count $C_1$ in the dividend count channel is $R \times N + r$, where R is the reading of the carry counter and r is the remainder count indicated on the scale 30d of the scaledown counter 30. Similarly, the scaledown counter 38 in the divisor count channel 22 counts the incoming pulses 26 to the latter channel and develops a carry pulse in response to each Nth count of the scaledown counter, where N is the scaledown factor corresponding to the preset position of the scaledown factor selector switch 38b in the latter counter. The carry pulse counter 40 counts and displays the number of carry pulses developed by the scaledown counter 38. The number of such carry pulses can be read from the scales 40e in the decades 40a through 40d of the counter 40. As in the case of the dividend count channel, the total accumulated pulse count in the divisor count channel 22 is equal to the reading of the carry counter times the scaledown factor N, which is preset in the scaledown counter 38, plus any remaining count in the latter counter.

Now, then, the quotient Q of a total accumulated pulse count $C_1$ in the dividend count channel 20 over a total accumulated pulse count $C_2$ in the divisor count channel 22 is $$Q = \frac{C_1}{C_2} = \frac{R \times N + r}{C_2}$$

If counting in the dividend channel 20 is terminated when the scaledown factor N which is preset in the scaledown counter 30 is in the ratio of $10^n$ to the total accumulated pulse count $C_2$ in the divisor count channel 22, where $n$ is any plus or minus integer, the above equation becomes $$Q = R \times 10^n = \frac{r}{C_2}$$

As preliminarily noted, if the total accumulated pulse count $C_2$ in the divisor count channel is sufficiently large, the remainder count $r$ remaining in the dividend channel scaledown counter 30 when counting is terminated can be neglected, in which case the quotient Q becomes $$Q = R \times 10^n$$

In other words, if counting is terminated when the preset dividend scaledown factor N is in the ratio of $10^n$ to the total accumulated pulse count in the divisor count channel, where $n$ can be any selected plus or minus integer or power, the reading R of the dividend channel carry counter 32 is numerically equal to the quotient of the total accumulated pulse count in the dividend count channel over the total accumulated pulse count in the divisor count channel. All that is necessary to obtain the decimal value of the quotient is to properly indicate the decimal point, the position of which is pre-established by the selected integer or power $n$.

For example, if we elect to terminate counting when the total accumulated pulse count in the divisor count channel becomes 3, 30, 300, 3,000 or 30,000, say 3,000 pulse counts, for example, a scaledown factor of 3 is preset into the dividend channel scaledown counter 30. Assuming that when counting is terminated, the reading R of the dividend channel carry counter is 76451 as indicated, the quotient of the dividend pulse count over the divisor pulse count is $$Q = \frac{76451 \times 3}{3,000} = 76451 \times 10^{-3} = 76.451$$

In essence, therefore, the procedure followed in the present instrument when making a quotient determination of two pulse counts is, first, select a total accumulated count in the divisor count channel at which counting is to be terminated and preset the appropriate scaledown factor into the dividend channel scaledown counter 30, then, begin the count, and, finally, note the carry count displayed by the dividend carry counter 32 when the selected accumulated count is reached in the divisor channel. Now it is evident that this procedure could be followed with an instrument equipped with a simple indicating digital pulse counter in the divisor channel in place of the illustrated scaledown and carry counter arrangement by having the operator of the instrument simply note the reading of the dividend channel counter when the preselected total accumulated pulse count appears in the divisor counter. It is preferable, however, to have counting end or repeat automatically when the preselected total accumulated divisor pulse count is reached. This automatic termination or repetition of the count could be accomplished, of course, with any digital counter equipped with means for sensing the preselected divisor count and with means for terminating or repeating the count when the preselected divisor count is reached. It is also evident that such an automatic instrument could be provided with one knob for presetting the scaledown factor into the scaledown counter of the dividend channel and another knob or knobs for presetting the preselected total accumulated pulse count into the divisor channel. It is preferable, however, for simplicity of operation, that when the selected count is preset in the divisor channel, the appropriate scaledown factor be simultaneously preset into the dividend channel. The inclusion of the scaledown counter 38 in the divisor count channel 22 permits this simultaneous presetting of the dividend channel scaledown factor and divisor channel count to be simply and uniquely accomplished, as follows:

Recalling that the different scaledown factors which can be preset into the dividend channel scaledown counter 30 of the illustrated instrument are 0, 1, 2, 3, 4, 5, 6, 7, 8, 9 and that for the dividend channel carry counter 32 to indicate the numerical value of the quotient of the dividend channel count over the divisor channel count, the selected scaledown factor and the preselected divisor count must be in the ratio of a power of 10, it is evident that the preselected divisor counts which can be used in the instrument are equal to the above scaledown factors times any decimal multiplier, such as $10^0$, $10^1$, $10^2$, $10^3$, $10^4$, and so on. Now, with the scaledown counter 38 included in the divisor count channel 22, it is evident that when the divisor scaledown factor presetting switch 38b of the latter counter is set to any selected scaledown factor N, a carry pulse will appear at the output of the scaledown counter 38 when the accumulated pulse count in the divisor count channel 40 equals N or $N \times 10^0$, a carry pulse will appear at the output of the first decade 40a of the dividend channel carry counter 40 when the accumulated pulse count in the dividend channel equal $N \times 10^1$, a carry pulse will appear at the output of the second decade 40b when the accumulated pulse count in the divisor channel equals $N \times 10^2$, a carry pulse will appear at the output of the third decade 40c when the accumulated divisor pulse count equals $N \times 10^3$, and a carry pulse will appear at the output of the fourth decade 40d when the accumulated divisor pulse count equals $N \times 10^4$. For example, if the selector switch 38b is set to the position associated with the scaledown factor 7, an accumulated divisor count of 7 will be indicated by a carry pulse at the output of the scaledown counter 38, a divisor count of 70 will be indicated by a carry pulse at the output of decade 40a, a divisor count of 700 will be indicated by a carry pulse at the output of decade 40b, and so on.

When the divisor pulse count, as well as the dividend pulse count, is scaled down in this way, we may rewrite the preceding equations as follows. In the following equations, the remainder count $r$ remaining in the dividend scaledown counter 30 is neglected. At the close of a counting interval ending when a carry pulse appears at the output of the divisor channel scaledown counter 38 or at the output of any one of the decades 40a, 40b, 40c or 40d of the divisor channel carry counter 40, the total accumulated pulse count $C_1$ in the dividend count channel is $$C_1 = R \times N$$

where R is the reading of the dividend channel carry counter and N is the scaledown factor which is preset into both the dividend count channel and the divisor count channel. At the close of the above counting interval, the total accumulated pulse count $C_2$ in the divisor count channel is $$C_2 = N \times 10^n,$$

where $n$ is zero if the count is terminated in response to the first carry pulse at the output of the divisor channel scaledown counter 38, 1 if the count is terminated in response to the first carry pulse at the output of the first carry counter decade 40a, 2 if the count is terminated in response to the first carry pulse at the output of carry counter decade 40b, 3 if the count is terminated in response to the first carry pulse at the output of carry counter decade 40c, and 4 if the count is terminated in response to the first carry pulse at the output of carry counter decade 40d. The quotient Q of the two pulse counts $C_1$ and $C_2$ is then $$Q = \frac{C_1}{C_2} = \frac{R \times N}{N \times 10^n} = \frac{R}{10^n}$$

In other words, if the count is terminated in response to the first carry pulse at the output of the divisor channel scaledown counter 38 or at the output of any one of the carry counter decades 40a through 40d, the reading R of the dividend channel carry counter 32 is the correct numerical value of the quotient of the total accumulated pulse count in the dividend channel over the total accumulated pulse count in the divisor channel. Thus, when the dividend and divisor counts are scaled down by the same scaledown factor N, all that is necessary to obtain a correct quotient reading in the dividend channel scaledown counter 32 is to terminate the count when the first carry pulse appears at the output of the divisor channel scaledown counter 38 or at the output of one of the divisor channel carry counter decades 40a through 40d. In the illustrative embodiment of the present instrument, the decimal multiplier selector knob 50 is preset to cause automatic termination of the count in response to the first carry pulse at the output of the divisor channel scaledown counter 38 or at a selected decade of the divisor channel carry counter 40. The decimal multipliers identifying the various positions of the selector knob 50 correspond to the various values of the decimal multiplier $10^n$ indicated above. For example, if the selector knob 50 is set to the position identified by the decimal multiplier 100, the movable contact 52f of the selector switch 52 engages contact 52c of the switch so that when the first carry pulse appears at the output of the second carry counter decade 40b, a control pulse is delivered through the selector switch 52 to the input gates 29 and 36 of the counting channels. As explained earlier, this control pulse terminates or effects repetition of counting in the channels. The decimal point indicating lamp switch 72 is simultaneously set to energize the appropriate decimal point indicating lamp 34a through 34e and thereby indicate the position of the decimal point in the quotient display of the dividend channel carry counter 32. Thus, when the selector knob 50 is set to the decimal multiplier 1, lamp 34a is illuminated. When the knob 50 is set to the decimal multiplier position 10, lamp 34b is illuminated. When the selector knob 50 is set to the decimal multiplier position 100, lamp 34c is illuminated, and so on.

From the preceding discussion, it is evident that an accumulated divisor count at which counting will be automatically terminated is preset into the divisor channel by setting selector knob 46 to a selected integer and setting selector knob 50 to a selected decimal multiplier and that the divisor count which is thereby preset into the divisor channel equals the selected integer times the selected decimal multiplier. Thus, in the illustrated instrument, the preset divisor count may numerically equal any one of the integers 0 through 9 times any one of the decimal multipliers, 1, 10, 100, 1,000 or 10,000.

Briefly reviewing the operation of the illustrated instrument, a total accumulated divisor pulse count, within the range of the instrument, which will afford the desired accuracy of measurement is first selected. The selected divisor count is then preset in the divisor count channel by turning the selector knob 46 to the selected integer and the selector knob 50 to the selected decimal multiplier. Setting the selector knob 46 simultaneously presets the scaledown factor selector switches 30b and 38b to the appropriate scaledown factor for the selected divisor count. Setting the selector knob 50 presets the selector switch 52 to condition the instrument for automatic termination or repetition of the count, depending on the position of the switch 64, when the preselected count is reached in the divisor channel. Knob 50 also presets the selector switch 72 to illuminate the proper decimal point indicating lamp 34a through 34e.

As the count progresses in the count channels, the scaledown counter 30 in the dividend count channel 20 develops a carry pulse in response to each Nth count of the counter, where N is the scaledown factor corresponding to the preset position of the selector knob 46. The carry counter 32 in the dividend count channel counts and displays the number of carry pulses developed by the scaledown counter 30. The same events occur in the divisor count channel 22. When the preset total accumulated pulse count is reached in the divisor channel, a control pulse is delivered to the input gates 29 and 36 through the selector switch 52 and opens these gates to terminate counting in both channels. If switch 64 is open, gates 29 and 36 remain open until reclosed by manual operation of the reset switch 70. If switch 64 is closed, the control pulse delivered through the selector switch 52 triggers the reset pulse generator 62 which then generates a reset pulse for resetting all of the counters to zero and reopening the gates 29 and 36 to repeat the count. The quotient of the total dividend pulse count over the total divisor pulse count at the end of a counting interval is read directly from the display scales 32f of the dividend channel carry counter 32, as already noted.

When the instrument is used to make a frequency or counting rate determination, divisor channel switch 42 is closed to the time interval generator 28 so that the pulses 26 delivered to the divisor channel comprise timing pulses which occur at preset time intervals, such as .1 second intervals. The operation of the instrument is exactly the same as described above except that in frequency or counting rate measurements, selector knobs 46 and 50 are initially set to preset a counting time interval, rather than a pulse count, into the divisor count channel 22. Also, in this latter application of the instrument, the divisor channel scaledown counter 38 counts units of time rather than pulses. The carry count displayed by the dividend carry counter 32 at the end of the preset counting interval equals the time rate of occurrence of the pulses delivered to the dividend channel, i.e., frequency or counting rate.

Time interval generator 28 may comprise any type of means for generating electrical timing pulses at predetermined time intervals. FIG. 2 illustrates one type of time interval generator which can be used in the instrument. This time interval generator comprises a scaledown counter 76 which, for simplicity, may be regarded at this point as being of the same type as the scaledown counters 30 and 38 described earlier. Scaledown counter 76 may be preset with a scaledown factor of 6, for example, in which case the frequency of the timing pulses generated by the scaledown counter is 60/6 or 10 pulses per second. In other words, the timing pulses occur at 1/10 second intervals.

When the instrument is used for ratio counting, that is, determining the ratio of an unknown frequency $f_1$ to a known frequency $f_2$, the unknown frequency may be fed to the dividend channel 20 and the known frequency may be fed to the divisor channel 22. Before the actual count is started, knobs 46 and 50 are set to preset a desired count into the divisor channel and appropriate scaledown factors into the dividend and divisor channels. Counting is stopped automatically when this preset count is reached in the divisor channel, as before. The frequency ratio $f_1/f_2$ is then $$\frac{f_1}{f_2} = \frac{C_1/T}{C_2/T}$$

where $C_1$ is the total accumulated count in the dividend channel and $C_2$ is the total accumulated count in the divisor channel at the end of the count, and T is the time of measurement or counting time interval. The time of measurement T is the same in both channels, of course. Recalling that the dividend count $C_1$ equals the reading R of the dividend channel carry counter 32 multiplied by the preset scaledown factor N in the dividend channel and that this scaledown factor N is in the ratio of $10^n$ to the accumulated divisor count $C_2$ when counting is terminated, the above equation becomes $$\frac{f_1}{f_2} = R \times 10^n$$

where $n$ is the decimal multiplier corresponding to the preset position of the knob 50.

The carry counter reading R is, then, the numerical value of the frequency ratio. Presetting the knob 50, of course, illuminates the proper decimal point indicator lamp 34a–34e so that the decimal value of the ratio may be read directly from the dividend channel carry counter 32.

The above method of determining frequency ratios requires that both frequencies be available simultaneously. In some cases, however, it may be difficult or impossible to obtain both frequencies simultaneously. For example, when the frequencies whose ratio is to be determined are pulse frequencies in which the pulses are derived from the detection of radioactive emissions from two radioactive sources, only one pulse frequency may be available at any one time due to the availability of but a single radiation detector. In this case, the instrument must be capable of making the frequency ratio determination by first counting one frequency and then the other.

To this end, the instrument illustrated in FIG. 1 is equipped with a coincidence pulse generator 80 which is connected with selector switches 82a, 82b, 82c, 82d and 82e through lines 84a, 84b, 84c, 84d and 84e. Each selector switch has ten positions identified by the integers 0 through 9, respectively, as shown. Selector switches 82a–82e are electrically connected with the counting decade 38a of the divisor channel scaledown counter 38 and with the counting decades 40a–40d of the divisor channel carry counter 40, respectively, as shown, so that a pulse is delivered from each of the decades 38a and 40a–40d through the respective selector switches 84a–84e to the coincidence pulse generator 80 each time the displayed count in each decade becomes the same as the integer associated with the position of its respective selector switch. For example, if switch 82a is set to the integer 3, a pulse is delivered from the counting decade 38a through switch 82a to the coincidence pulse generator 80 each time the count displayed in decade 38a becomes 3. If switch 82a is set to zero, a pulse is delivered to the coincidence pulse generator 80 each time the decade 38a resets to zero, and so on. The same applied to the other selector switches and decades.

When the selector switches 82a–82e are set to the same number, such as 46531, for example, the coincidence pulse generator 80 will receive pulses from the decades 38a and 40a–40d simultaneously when the count in the divisor channel becomes 46531. In other words, the pulses from the decades are in coincidence at the coincidence pulse generator 80. The coincidence pulse generator generates an output pulse in line 86 in response to this coincidence of the pulses from decades 39a and 40a–40d. A preset counter of this kind which generates a coincidence output pulse at a preset count is disclosed in the previously mentioned Computer-Measurements Company manual.

Now if the scaledown factor selector switch 38b of the divisor channel scaledown counter 38 is set to zero and switch 42 is set to the time interval generator 28, a carry pulse will appear at the output of the scaledown counter 38 at each tenth count of the scaledown counter. Assuming that timing pulses are delivered to the scaledown counter at .1 second intervals by the time interval generator 28, as described earlier, carry pulses will appear at the output of the scaledown counter 38 at 1 second intervals and the divisor channel carry counter 40 reads seconds. In this case, then, the divisor channel counters read real time and when combined with the selector switches 82a–82e and the coincidence pulse generator 80 provide a preset timer which generates a coincidence pulse in line 86 upon the expiration of a time interval equal to the number of seconds which are preset in the selector switches 82a–82e.

Coincidence generator output line 86 connects to one contact 88a of a mode selector switch 88. Switch 88 has a second contact 88b connected to the movable contact 52f of the decimal multiplier selector switch 52 and a third contact 88c connected to the movable contact 90a of a selector switch 90, the movable contact 90a of which is fixed to the shaft 56 of selector knob 50. When the instrument is used to determine quotients and counting rates or frequencies in the manner described earlier, switch 88 is closed to contact 88b so that the control pulse delivered through the decimal multiplier switch 52 at the end of a count passes through mode selector switch 88 to the gates 29 and 36 and the reset pulse generator 62.

Switch 90 is a second decimal multiplier switch having contacts 90b, 90c, 90d, 90e and 90f connected to the outputs of the decade 30a in the dividend channel scaledown counter 30 and the decades 32a–32e of the dividend channel carry counter 32, respectively, through lines 92b–92f, respectively, as shown.

From this description and the earlier description relating to the operation of the decimal multiplier selector switch 52, it is evident that when movable contact 90a of switch 90 is engaged with contact 90b, by rotation of selector knob 50 to the decimal multiplier 1 position, a pulse is delivered through switch 90 to the mode switch contact 88c when the accumulated dividend channel count equals the decimal multiplier 1 multiplied by the preset scaledown factor N in the dividend channel scaledown counter 30. Similarly, when the switch contact 90a is engaged with any of the other switch contacts 90c–90f by rotation of the selector knob 50 to the corresponding decimal multiplier 10, 100, 1,000 or 10,000, a control pulse is delivered through switch 90 to the mode switch contact 88c when the accumulated dividend count equals the preset decimal multiplier multiplied by the preset scaledown factor N in the dividend channel scaledown counter 30.

Mode switch 88 includes a knob 94 having three positions identified by the legends "QUOTIENT," "PRESET COUNT" and "RATIO." When knob 94 is set to the "QUOTIENT" position, mode switch 88 is closed to contact 88b to condition the instrument for quotient and counting rate or frequency determinations, as already noted. When the knob is set to the "PRESET COUNT" position, the mode switch 88 is closed to contact 88c and when set to the "RATIO" position, the mode switch is closed to contact 88a.

These two latter positions of the mode switch are used in the alternative method of ratio counting when the frequencies whose ratio is desired are not simultaneously available, as follows: The mode switch 88 is closed to contact 88c by setting the mode switch knob 94 in its "preset count" position. A desired count is preset into the dividend channel by setting the selector knob 46 to the appropriate integer and selector knob 50 to the appropriate decimal multiplier. The same scaledown factor is thereby preset in both channels. Switch 42 is closed to the time interval generator 28. The known frequency or the frequency from which is to be derived the divisor count of the frequency ratio determination is then fed to the dividend channel, whereupon counting is commenced.

When the preset count is reached in the dividend channel 20, a control pulse is delivered through switch 90 and mode switch 88 to the gates 29 and 36 which are thereby opened to terminate counting in the two channels. If the repeat switch 64 is closed, counting will be repeated, as before. At the end of counting, the reading of the divisor channel counters 38 and 40 is observed. The divisor channel counters will not indicate real time, of course, unless the scaledown factor of zero is preset into the divisor channel.

Selector switches 82a–82e are now set to the same reading as that observed on the divisor channel counters and mode switch 88 is closed to contact 88a by setting of the mode switch knob 94 in its "ratio" position. After the instrument is thus set, a new count is made by feeding the unknown frequency, or the frequency from which is to be derived the dividend count of the desired frequency ratio, to the dividend channel 20. When the elapsed time of counting equals the reading of the preset selector switches 82a–82e the coincidence pulse generator generates a coincidence pulse which is delivered to the gates 29 and 36 through the mode switch 88 to terminate the count.

Now it is evident that since the elapsed time of the known or standard frequency count and the elapsed time of the unknown frequency count are the same and since the same scaledown factor is used in both counts, the equations set forth in the discussion of the first method of ratio counting apply as well to the alternative method of ratio counting so that the reading of the dividend channel carry counter at the end of the unknown frequency count is the numerical value of the frequency ratio. The decimal point is indicated as before.

FIG. 3 illustrates an alternative binary scaledown counter which can be used in the instrument in place of the decade scaledown counters shown in FIG. 1. The binary dividend channel scaledown counter 100 comprises binary counters 100a, 100b, 100c, 100d, such as flip-flops, and a scaledown factor selector switch 104 for extracting the carry pulse between selected stages. The divisor channel scaledown counter 102 is identical and comprises binary stages 102a, 102b, 102c and 102d and a scaledown factor selector switch 106 for extracting the carry pulses between selected stages. The selector switches are operatively connected to a selector knob 108 having positions identified by the binary series integers 2, 4, 8 and 16. The incoming pulses to each scaledown counter are applied to the first stage of the counter and the carry pulse output from each counter is taken from the movable contact of the counter selector switch 104 or 106.

When knob 108 is set to the integer 2, the scaledown selector switches 104 and 106 are set to extract the carry pulses which occur between the first and second stages of the respective counters. These carry pulses occur, of course, in response to each second incoming pulse to the counters. When the knob 108 is set to integer 4, the selector switches 104 and 106 are set to extract the carry pulses between the second and third stages of the counters which occur in response to each fourth incoming pulse to each counter. Similarly, when knob 108 is set to integer 8, the scaledown counters produce carry pulses in response to each eighth incoming pulse and when set to integer 16, the scaledown couters produce carry pulses in response to each sixteenth incoming pulse. The scaledown counters 100 and 102, therefore, provide the scaledown factors 2, 4, 8 and 16.

In use, the scaledown counters of FIG. 3 are inserted in the instrument of FIG. 1 in place of the scaledown counters 30 and 38 so that the carry pulses produced by the counters 100 and 102 are counted by the carry counters 20 and 22. The operation of the instrument with the scaledown counters 100 and 102 is precisely the same as described in connection with FIG. 1 except that the permitted scaledown factors are 2, 4, 8 and 16 rather than 0 through 9 as in the instrument of FIG. 1. The scaledown counters of FIG. 3 are superior to those of FIG. 1 in that the counters of FIG. 3 do not require the resetting circuitry which is necessary in the scaledown counters of FIG. 1.

These two types of scaledown counters are not the only types of scaledown counters which can be used in the instrument.

Ring counters with means to extract the carry pulses between selected stages may be used, for example, as well as any other kind of counter with means to produce a carry pulse in response to preselected numbers of input pulses. The scaledown counters may obviously be based on any system of counting.

Other types of carry counters than decade carry counters may also be used in the instrument. For example, the decade carry counters of FIG. 1 may be replaced by binary carry counters or by carry counters which are based on any other counting system. Also, as shown in FIG. 4, the carry pulses produced by the scaledown counters can be counted in a mechanical digital carry counter rather than in an electronic carry counter as in FIG. 1.

The range of the instrument may obviously be expanded by adding as many counting stages as desired to the scaledown counters and/or the carry counters of the instrument.

Clearly, then, the invention herein described and illustrated is fully capable of attaining the objects and advantages preliminarily set forth.

I claim:
1. A direct readout computer-scaler, comprising:
   (a) a divisor count channel including a first digital pulse counter having
      (1) a first input terminal for receiving a first train of incoming pulses of unknown frequency, which frequency may be periodic or aperiodic; and
      (2) means for generating an electrical control pulse in response to a predetermined accumulated pulse count in said divisor count channel constituting an integral multiple of $10^n$ where $n$ is any positive integer;
   (b) a dividend count channel including a second digital pulse counter having
      (1) a second input terminal for receiving a second train of incoming pulses of unknown frequency, which frequency may be periodic or aperiodic, said second train of pulses being wholly independent of said first train of pulses;
      (2) means for generating an electrical carry pulse in response to each Nth count of said second digital pulse counter, where N is a preselected integer equal to said integral multiple;
      (3) a digital carry pulse counter for counting said carry pulses; and
      (4) means responsive to said electrical control pulse from said divisor count channel to terminate counting in said dividend count channel whereby the count displayed by said carry pulse counter in said dividend count channel when counting is terminated, is equal to $10^n$ times the total number of pulses counted in said dividend count channel divided by said predetermined pulse count in said divisor count channel.

2. A direct readout computer-scaler according to claim 1, in which said divisor count channel includes a pre-settable means to establish said integral multiple, said pre-settable means being coupled to said means for generating said electrical carry pulse in said dividend count channel such that the value of N is simultaneously changed with changes in said pre-settable means to assure that said integral multiple and N are always equal.

3. A digital readout computer-scaler according to claim 2, in which said integral multiple and value of N may be pre-set to any one of the successive integers 1, 2, 3, 4, 5, 6, 7, 8, and 9.

4. A direct readout computer-scaler according to claim 1, including decimal point indicating means in said dividend count channel responsive to the preselected value of $n$ to indicate a decimal point in the display count of said carry pulse counter in a position such that the displayed count equals the quotient defined by the total counts in said dividend count channel divided by the total counts in said divisor count channel.

5. A direct readout computer-scaler according to claim 4, including storage means connected to said divisor count channel for establishing a time interval equal to the time to complete said predetermined accumulated pulse count; and means connected to said storage means for passing a coincidence signal to said dividend count channel to terminate counting in said dividend count channel at a time from the start of the counting of said dividend count channel equal to said time interval, whereby said first train of incoming pulses may be counted in said divisor count channel to establish said time interval and at a subsequent arbitrary later period in time said second incoming train of pulses may be counted in said dividend count channel and thence terminated by said coincidence signal whereby the quotient defined by the total count of said first train of pulses divided by the total count of said second train of pulses is displayed by said carry pulse counter at the termination of counting of said dividend count channel even though said first and second trains of pulses are counted at different times.

References Cited
UNITED STATES PATENTS

| | | | |
|---|---|---|---|
| 2,743,419 | 4/1956 | Chatterton | 235—92 |
| 2,853,235 | 9/1958 | Brinster | 235—92 X |
| 3,006,549 | 10/1961 | Hughes | 235—160 |
| 3,133,189 | 5/1964 | Bagley | 235—92 |
| 2,828,468 | 3/1958 | Ball | 235—92 |

MAYNARD R. WILBUR, *Primary Examiner.*

G. J. MAIER, *Assistant Examiner.*